(12) United States Patent
Mitani

(10) Patent No.: US 12,556,016 B2
(45) Date of Patent: Feb. 17, 2026

(54) POWER SUPPLY SYSTEM, AND MOVING OBJECT INCLUDING POWER SUPPLY SYSTEM

(71) Applicant: HONDA MOTOR CO., LTD., Tokyo (JP)

(72) Inventor: Manabu Mitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 18/619,968

(22) Filed: Mar. 28, 2024

(65) Prior Publication Data

US 2024/0333008 A1    Oct. 3, 2024

(30) Foreign Application Priority Data

Mar. 31, 2023    (JP) .................. 2023-056877

(51) Int. Cl.
*H02J 7/00* (2006.01)
*H02J 7/34* (2006.01)

(52) U.S. Cl.
CPC ............ *H02J 7/0063* (2013.01); *H02J 7/345* (2013.01); *H02J 2310/40* (2020.01)

(58) Field of Classification Search
CPC .......... H02J 7/0063; H02J 7/345; H02J 10/40
USPC .................................... 307/9.1, 10.1
See application file for complete search history.

(56) References Cited

U.S. PATENT DOCUMENTS

| | | | | |
|---|---|---|---|---|
| 2014/0306666 | A1* | 10/2014 | Choi | H02J 7/0016 320/134 |
| 2020/0039365 | A1* | 2/2020 | Chang | B60L 50/00 |
| 2020/0361323 | A1* | 11/2020 | Chon | H02M 7/44 |
| 2024/0198854 | A1* | 6/2024 | Jeon | B64U 50/34 |

FOREIGN PATENT DOCUMENTS

| | | |
|---|---|---|
| JP | 2009-042157 A | 2/2009 |
| JP | 2010-141958 A | 6/2010 |
| JP | 5014923 B2 | 8/2012 |

* cited by examiner

*Primary Examiner* — Michael R. Fin
(74) *Attorney, Agent, or Firm* — Rankin, Hill & Clark LLP

(57) ABSTRACT

A first processing circuit of a power supply system can selectively perform: a first process of pre-charging a smoothing capacitor provided in a first load device by supplying electric power from a first power storage device to the first load device via a precharge resistor provided in the first processing circuit; a second process of discharging, via the precharge resistor, electric charges accumulated in the smoothing capacitor; and a third process of discharging, via the precharge resistor, electric charges accumulated in the first power storage device.

9 Claims, 13 Drawing Sheets

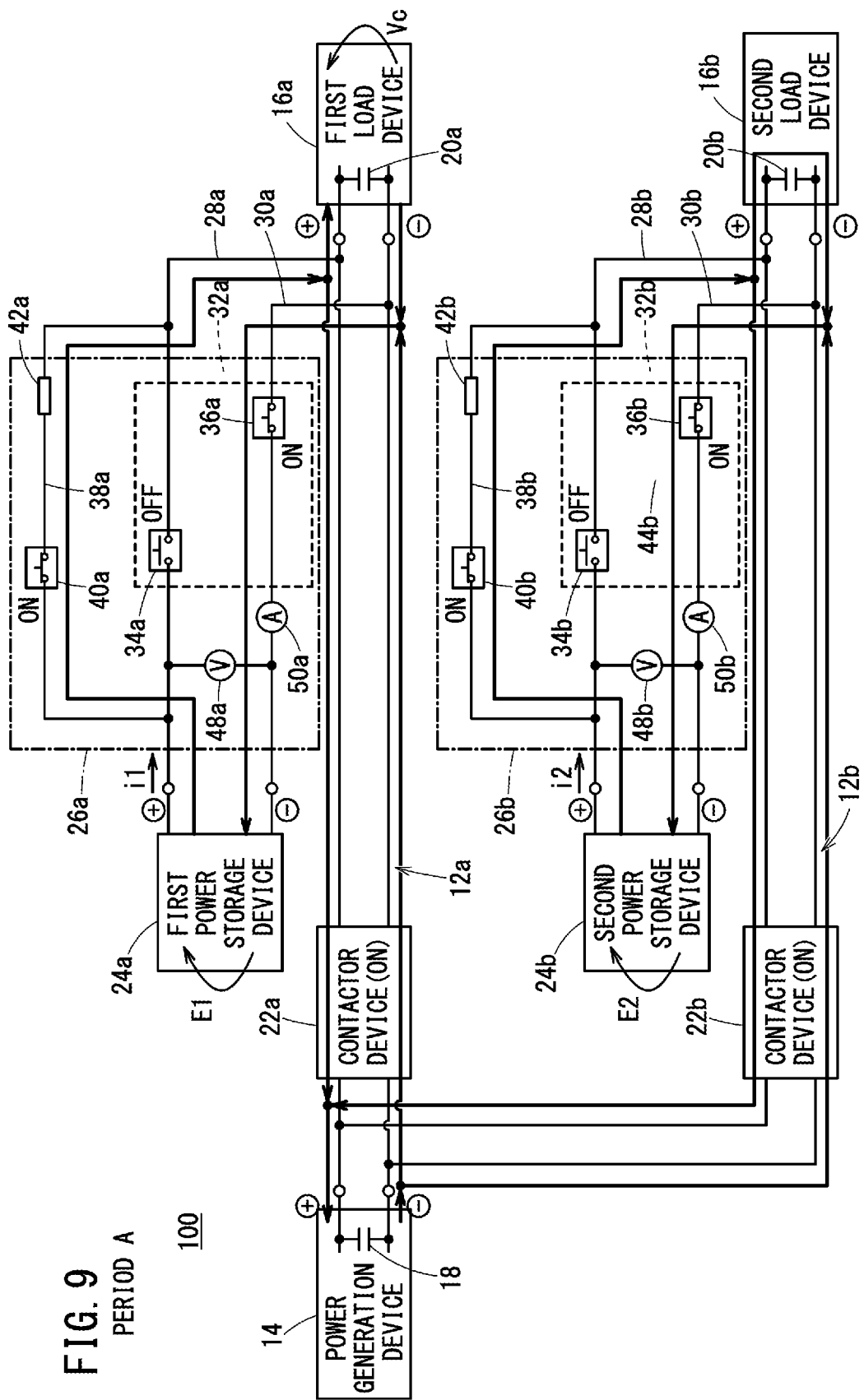

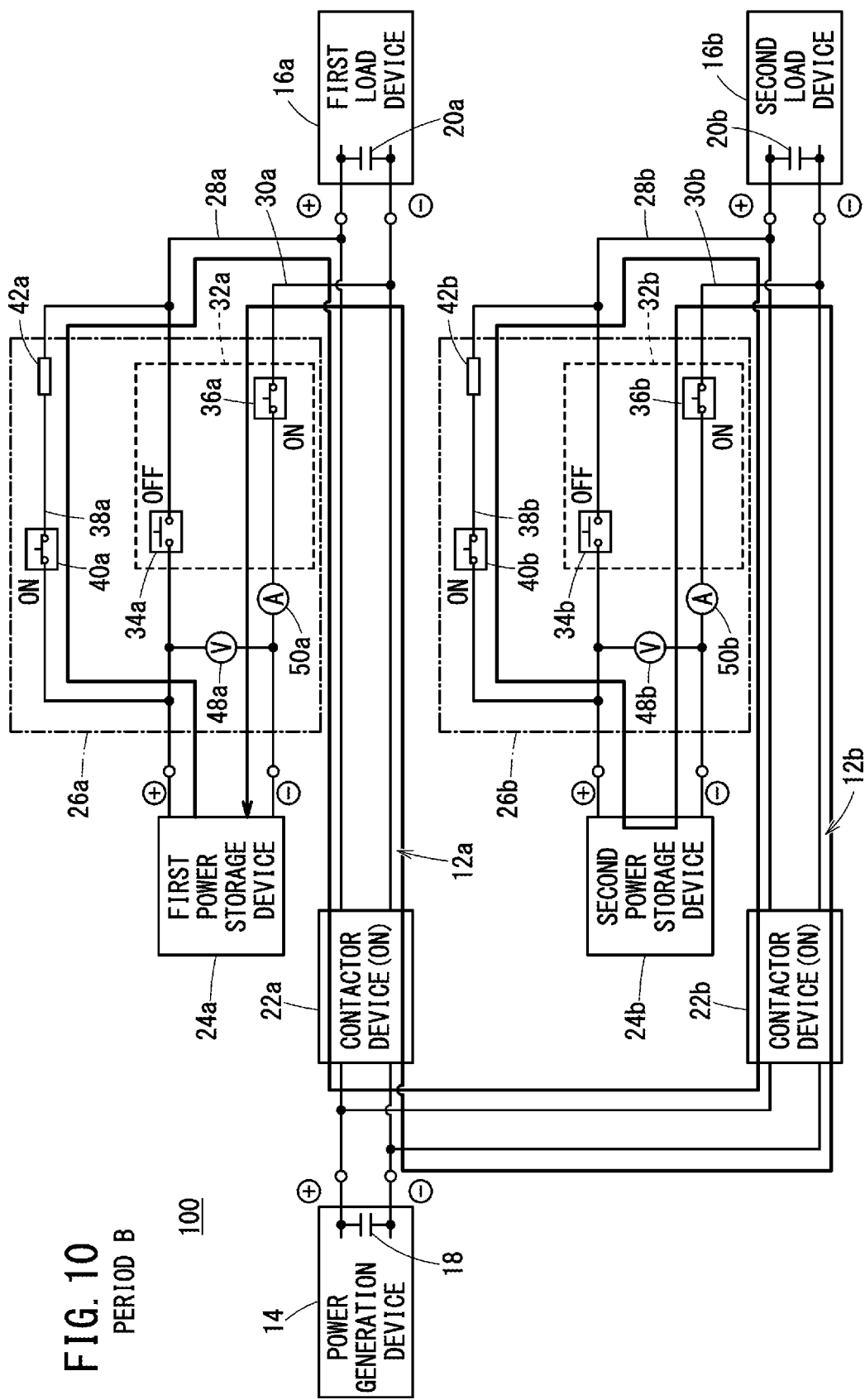

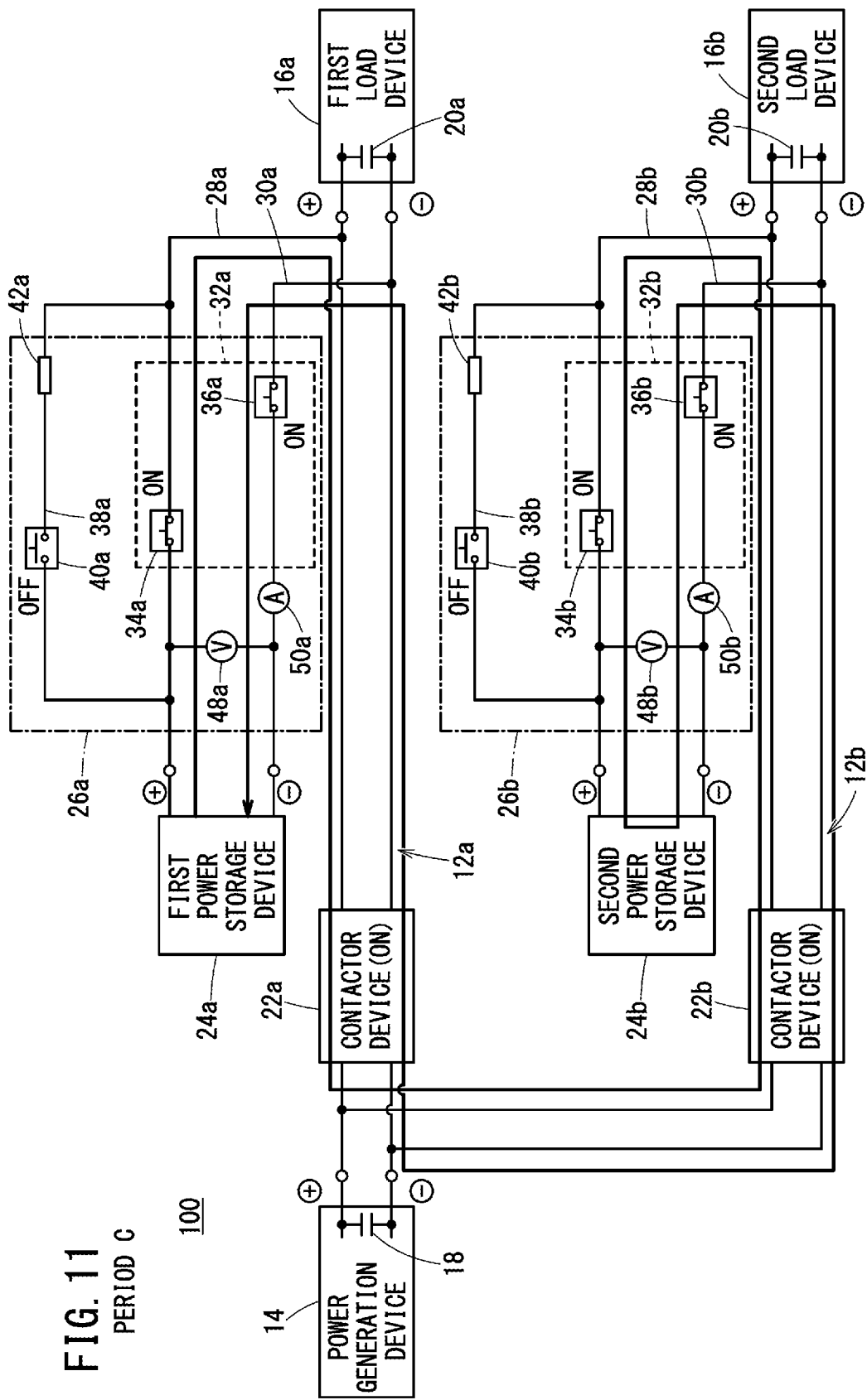
FIG. 11 PERIOD C

POWER SUPPLY SYSTEM, AND MOVING OBJECT INCLUDING POWER SUPPLY SYSTEM

CROSS-REFERENCE TO RELATED APPLICATIONS

This application is based upon and claims the benefit of priority from Japanese Patent Application No. 2023-056877 filed on Mar. 31, 2023, the contents of which are incorporated herein by reference.

BACKGROUND OF THE INVENTION

Field of the Invention

The present invention relates to a power supply system, and a moving object including the power supply system.

Description of the Related Art

In recent years, research and development have been conducted on electrification technology that contributes to energy efficiency in order to ensure that more people have access to affordable, reliable, sustainable and modern energy.

JP 2010-141958 A discloses a power supply system including a high-voltage battery (power storage device) and a motor generator (load device). Three relays, a resistor (precharge resistor), a capacitor (smoothing capacitor), and a step-down converter are interposed between the high-voltage battery and the motor generator. In this power supply system, the capacitor can be pre-charged via the resistor by controlling the on and off of the three relays. In addition, in this power supply system, the electric charges accumulated in the capacitor can be discharged via the resistor by controlling the on and off of the three relays.

SUMMARY OF THE INVENTION

There has been a demand for a more satisfactory power supply system.

The present invention has the object of solving the aforementioned problem.

A power supply system of the present invention comprises: a first power supply circuit configured to supply, to a first load device, direct current electric power output from a power generation device; a first power storage device connected to the first power supply circuit in parallel with the power generation device via a first processing circuit; a second power supply circuit configured to supply, to a second load device, the direct current electric power output from the power generation device; and a second power storage device connected to the second power supply circuit in parallel with the power generation device via a second processing circuit, wherein the first processing circuit is configured to selectively perform: a first process of precharging a smoothing capacitor provided in the first load device by supplying electric power from the first power storage device to the first load device via a precharge resistor provided in the first processing circuit; a second process of discharging, via the precharge resistor, electric charges accumulated in the smoothing capacitor; and a third process of discharging, via the precharge resistor, electric charges accumulated in the first power storage device.

A moving object of the present invention comprises the above-described power supply system.

According to the present invention, it is possible to provide a satisfactory power supply system and a satisfactory moving object.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9 is a diagram showing the operation of a power supply system of a comparative example at the time of system start-up preparation;
FIG. 10 is a diagram showing the operation of the power supply system of the comparative example at the time of system start-up preparation;
FIG. 11 is a diagram showing the operation of the power supply system of the comparative example at the time of system activation.

DETAILED DESCRIPTION OF THE INVENTION

It is conceivable that a plurality of power storage devices are connected in parallel to a load device. In such a power supply system, at the time of system start-up, an inrush current may flow from a power storage device having a high output voltage to a power storage device having a low output voltage. As a result of intensive studies, the present invention has conceived the following power supply system.

[Configuration of Power Supply System 10]

Figure 1:
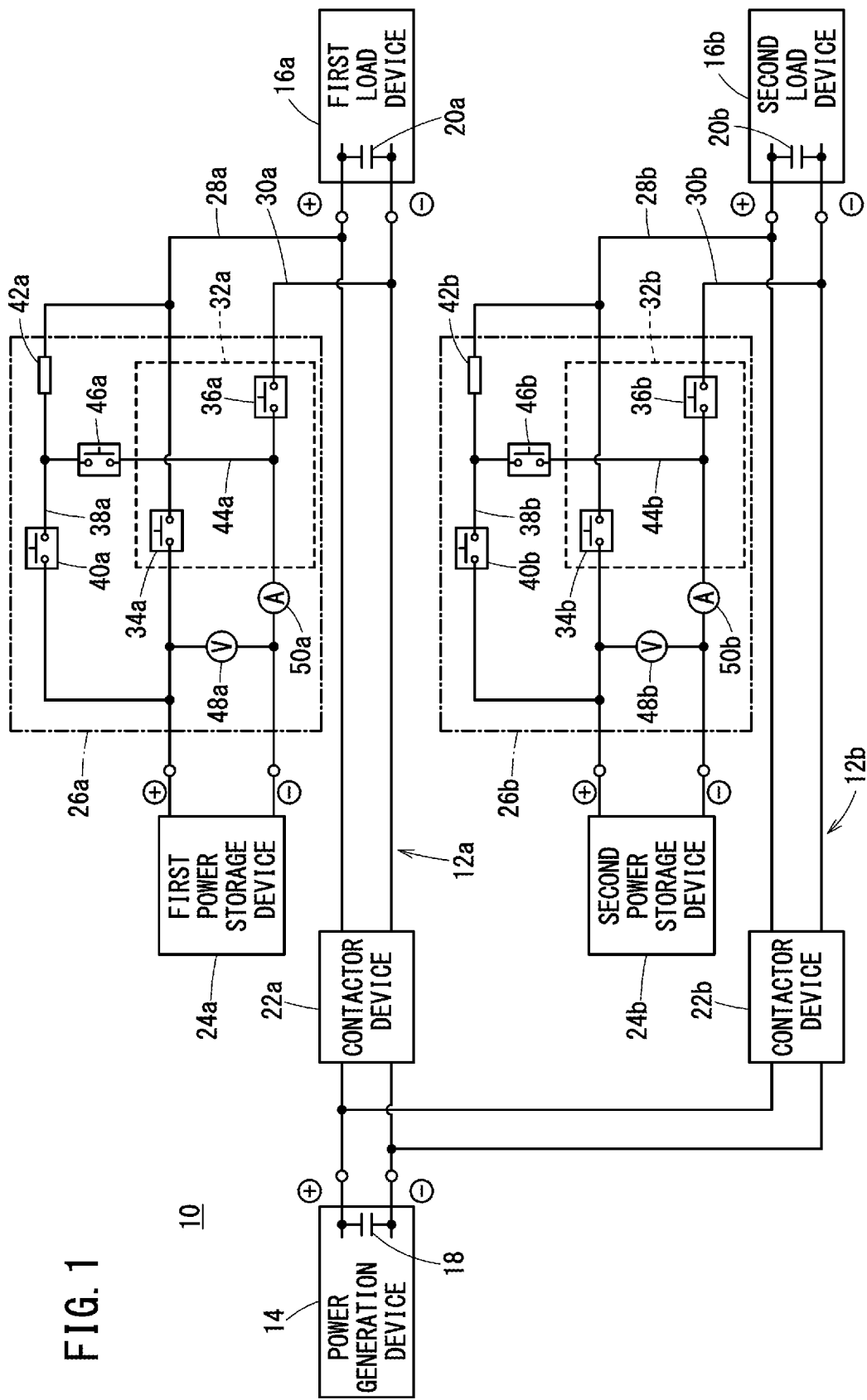
FIG. 1 is a schematic view of a power supply system.

FIG. 1 is a schematic view of a power supply system 10. The power supply system 10 includes a first power supply circuit 12a, and a second power supply circuit 12b. The first power supply circuit 12a supplies, to a first load device 16a, DC power output from a power generation device 14. The second power supply circuit 12b supplies, to a second load device 16b, the DC power output from the power generation device 14.

The power generation device 14 includes an engine, a generator, and a power control unit (all of them not shown). The engine drives the generator, and the generator generates three-phase AC power. The power control unit converts the three-phase AC power into DC power. The power generation device 14 includes a smoothing capacitor 18. When the power supply system 10 is started, firstly, the smoothing capacitor 18 is charged (pre-charged). Further, when the power supply system 10 is shut down, the smoothing capacitor 18 is discharged.

The power generation device 14 may include various sensors, and elements such as a fuse, a relay, a breaker, a diode, a transistor, a resistor, and a coil.

The first load device 16a and the second load device 16b each include an inverter and an electric motor (both of them not shown). The inverter converts input DC power into three-phase AC power. The electric motor is driven by the three-phase AC power. The first load device 16a and the second load device 16b may each include a DC/DC converter and a low-voltage drive device (both of them not shown). The DC/DC converter lowers the voltage of DC power input to the DC/DC converter. The low-voltage drive device is driven by the DC power output from the DC/DC converter. The first load device 16a includes a smoothing capacitor 20a. The second load device 16b includes a smoothing capacitor 20b. When the power supply system 10 is started, firstly, the smoothing capacitors 20a and 20b are charged (pre-charged). Further, when the power supply system 10 is shut down, the smoothing capacitors 20a and 20b are discharged.

The first load device 16a and the second load device 16b may each include various sensors, and elements such as a fuse, a relay, a breaker, a diode, a transistor, a resistor, a coil, and a capacitor.

The power supply system 10 includes contactor devices 22a and 22b. The contactor device 22a can disconnect the power generation device 14 from the first power supply circuit 12a. The contactor device 22b can disconnect the power generation device 14 from the second power supply circuit 12b.

The first power supply circuit 12a and the second power supply circuit 12b may each include elements such as a switch, a sensor, a fuse, a diode, a resistor, a coil, and a capacitor, in addition to the above-described configuration.

The contactor device 22a includes a pair of switches (not shown). One of the switches is provided on a positive wire connecting the power generation device 14 and the first power supply circuit 12a. The other switch is provided on a negative wire connecting the power generation device 14 and the first power supply circuit 12a.

The contactor device 22b includes a pair of switches (not shown). One of the switches is provided on a positive wire connecting the power generation device 14 and the second power supply circuit 12b. The other switch is provided on a negative wire connecting the power generation device 14 and the second power supply circuit 12b.

The power supply system 10 includes a first power storage device 24a and a second power storage device 24b. The first power storage device 24a is connected to the first power supply circuit 12a in parallel with the power generation device 14 via a first processing circuit 26a. The DC power output from the first power storage device 24a is supplied to the first load device 16a. The second power storage device 24b is connected to the second power supply circuit 12b in parallel with the power generation device 14 via a second processing circuit 26b. The DC power output from the second power storage device 24b is supplied to the second load device 16b.

The first power storage device 24a and the second power storage device 24b each include a lithium ion battery, for example. The first power storage device 24a and the second power storage device 24b may each include a secondary battery other than the lithium ion battery. The first power storage device 24a and the second power storage device 24b may each include a large-capacity capacitor.

The first processing circuit 26a includes a positive line 28a (a first wire or second wire), a negative line 30a (the second wire or first wire), and a contactor device 32a. The positive line 28a electrically connects a positive terminal of the first power storage device 24a and a positive terminal of the first power supply circuit 12a to each other. The negative line 30a electrically connects a negative terminal of the first power storage device 24a and a negative terminal of the first power supply circuit 12a to each other. The contactor device 32a includes a first switch 34a and a second switch 36a. The first switch 34a is provided on the positive line 28a. The second switch 36a is provided on the negative line 30a.

The first processing circuit 26a includes a bypass line 38a, a third switch 40a, and a precharge resistor 42a. The bypass line 38a electrically connects a portion of the positive line 28a located between the first power storage device 24a and the first switch 34a, to a portion of the positive line 28a located between the first switch 34a and the first load device 16a. The third switch 40a and the precharge resistor 42a are provided on the bypass line 38a. The third switch 40a is arranged closer to the first power storage device 24a than the precharge resistor 42a is. On the other hand, the precharge resistor 42a is arranged closer to the first load device 16a than the third switch 40a is.

The first processing circuit 26a includes a discharge connection line (connection line for discharge) 44a and a fourth switch 46a. The discharge connection line 44a electrically connects a portion of the bypass line 38a located between the third switch 40a and the precharge resistor 42a, to a portion of the negative line 30a located between the first power storage device 24a and the second switch 36a. The fourth switch 46a is provided on the discharge connection line 44a.

With the above configuration, one end of the precharge resistor 42a is electrically connected to a portion of the positive line 28a located between the first switch 34a and the first load device 16a. The other end of the precharge resistor 42a is connected via the third switch 40a to a portion of the positive line 28a located between the first switch 34a and the first power storage device 24a, and is connected via the fourth switch 46a to a portion of the negative line 30a located between the second switch 36a and the first power storage device 24a.

The first processing circuit 26a includes a voltage sensor 48a and a current sensor 50a. The voltage sensor 48a is connected to the positive line 28a and the negative line 30a so as to detect a terminal voltage (output voltage) of the first power storage device 24a. The current sensor 50a is provided on a portion of the negative line 30a located between the negative terminal of the first power storage device 24a and the fourth switch 46a.

The second processing circuit 26b includes a positive line 28b, a negative line 30b, and a contactor device 32b. The positive line 28b electrically connects a positive terminal of the second power storage device 24b and a positive terminal of the second power supply circuit 12b to each other. The negative line 30b electrically connects a negative terminal of the second power storage device 24b and a negative terminal of the second power supply circuit 12b to each other. The contactor device 32b includes a first switch 34b and a second switch 36b. The first switch 34b is provided on the positive line 28b. The second switch 36b is provided on the negative line 30b.

The second processing circuit 26b includes a bypass line 38b, a third switch 40b, and a precharge resistor 42b. The bypass line 38b electrically connects a portion of the positive line 28b located between the second power storage device 24b and the first switch 34b, to a portion of the positive line 28b located between the first switch 34b and the second load device 16b. The third switch 40b and the precharge resistor 42b are provided on the bypass line 38b. The third switch 40b is arranged closer to the second power storage device 24b than the precharge resistor 42b is. On the other hand, the precharge resistor 42b is arranged closer to the second load device 16b than the third switch 40b is.

The second processing circuit 26b includes a discharge connection line 44b and a fourth switch 46b. The discharge connection line 44b electrically connects a portion of the bypass line 38b located between the third switch 40b and the precharge resistor 42b, to a portion of the negative line 30b located between the second power storage device 24b and the second switch 36b. The fourth switch 46b is provided on the discharge connection line 44b.

With the above configuration, one end of the precharge resistor 42b is electrically connected to a portion of the positive line 28b located between the first switch 34b and the second load device 16b. The other end of the precharge resistor 42b is connected via the third switch 40b to a portion of the positive line 28b located between the first switch 34b and the second power storage device 24b, and is connected via the fourth switch 46b to a portion of the negative line 30b located between the second switch 36b and the second power storage device 24b.

The second processing circuit 26b includes a voltage sensor 48b and a current sensor 50b. The voltage sensor 48b is connected to the positive line 28b and the negative line 30b so as to detect a terminal voltage (output voltage) of the second power storage device 24b. The current sensor 50b is provided on a portion of the negative line 30b located between the negative terminal of the second power storage device 24b and the fourth switch 46b.

Each of the switches (the switches of the contactor devices 22a and 22b, the first switches 34a and 34b, the second switches 36a and 36b, the third switches 40a and 40b, and the fourth switches 46a and 46b) is switched between ON (connection) and OFF (disconnection). Each switch may be a relay. Each switch may be a semiconductor switch.

[Configuration of Control Device 54]

Figure 2:
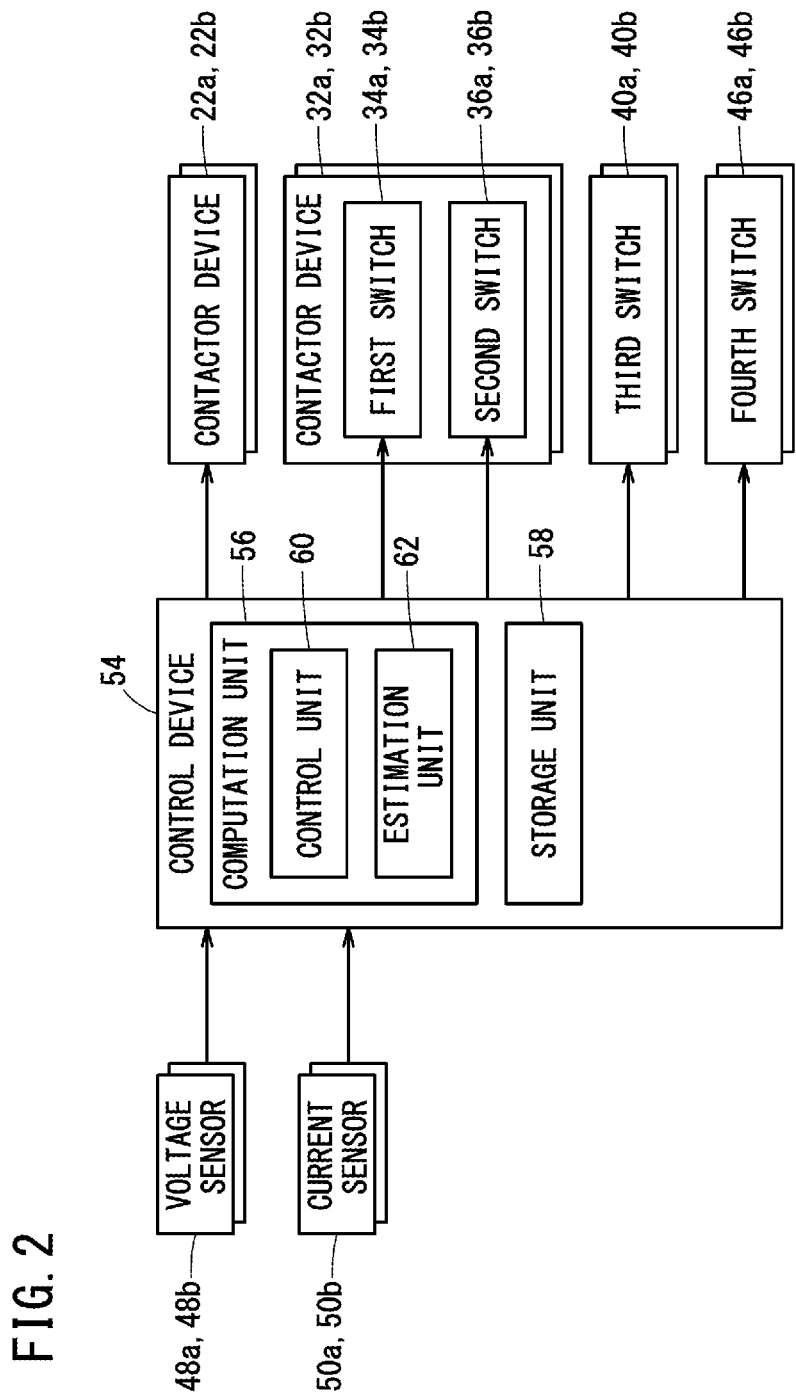
FIG. 2 is a control block diagram of a control device.

The power supply system 10 includes a control device 54. FIG. 2 is a control block diagram of the control device 54. The control device 54 acquires signals indicating voltages from the voltage sensors 48a and 48b. The control device 54 acquires signals indicating currents from the current sensors 50a and 50b. The control device 54 controls each of the switches (the switches of the contactor devices 22a and 22b, the first switches 34a and 34b, the second switches 36a and 36b, the third switches 40a and 40b, and the fourth switches 46a and 46b).

The control device 54 includes a computation unit 56 and a storage unit 58. The computation unit 56 is, for example, a processor such as a central processing unit (CPU) or a graphics processing unit (GPU). The computation unit 56 controls each device by executing a program stored in the storage unit 58. At least part of the computation unit 56 may be realized by an integrated circuit such as an application specific integrated circuit (ASIC) or a field-programmable gate array (FPGA). At least part of the computation unit 56 may be realized by an electronic circuit including a discrete device.

The computation unit 56 functions as a control unit 60 and an estimation unit 62. The control unit 60 can cause the power supply system 10 to selectively execute a system start-up preparation process, a system activation process, a system shutdown process, and a power storage device discharge process, which will be described later. Specifically, the control unit 60 can cause each process to be executed by controlling the on/off of each switch provided in the power supply system 10. The estimation unit 62 estimates the deterioration state of each power storage device (the first power storage device 24a and the second power storage device 24b).

The storage unit 58 is constituted by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least part of the storage unit 58 may be included in the processor, the integrated circuit, or the like described above.

[Operation of Power Supply System 10]

Figure 3:
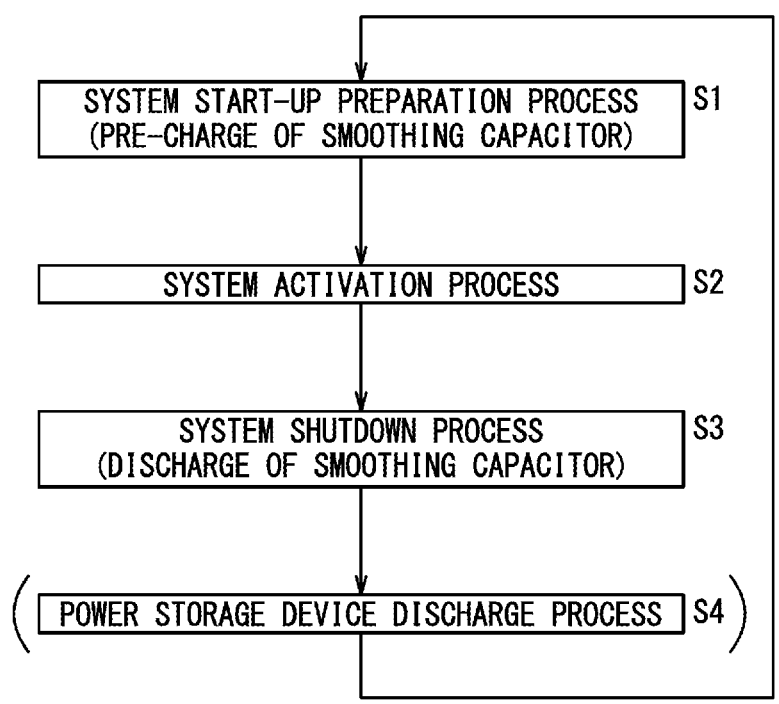
FIG. 3 is an operation flow of the power supply system.

FIG. 3 is an operation flow of the power supply system 10. The power supply system 10 can repeatedly perform a series of processes including the system start-up preparation process (step S1), the system activation process (step S2), and the system shutdown process (step S3). Further, the power supply system 10 can perform the power storage device discharge process (step S4) as necessary between the system shutdown process and the next system start-up preparation process. The operation of the power supply system 10 in each process will be described below.

In the following, a conductive state (a first conductive state) among the power generation device 14, the contactor device 22a, the first power supply circuit 12a, the first load device 16a, the first power storage device 24a, and the first processing circuit 26a in each process will be described. It should be noted that a conductive state (a second conductive state) among the power generation device 14, the contactor device 22b, the second power supply circuit 12b, the second load device 16b, the second power storage device 24b, and the second processing circuit 26b in each processing is the same as the first conductive state. Therefore, the description of the second conductive state will be omitted below.

[Operation of Power Supply System 10 in System Start-up Preparation Process]

Figure 4:
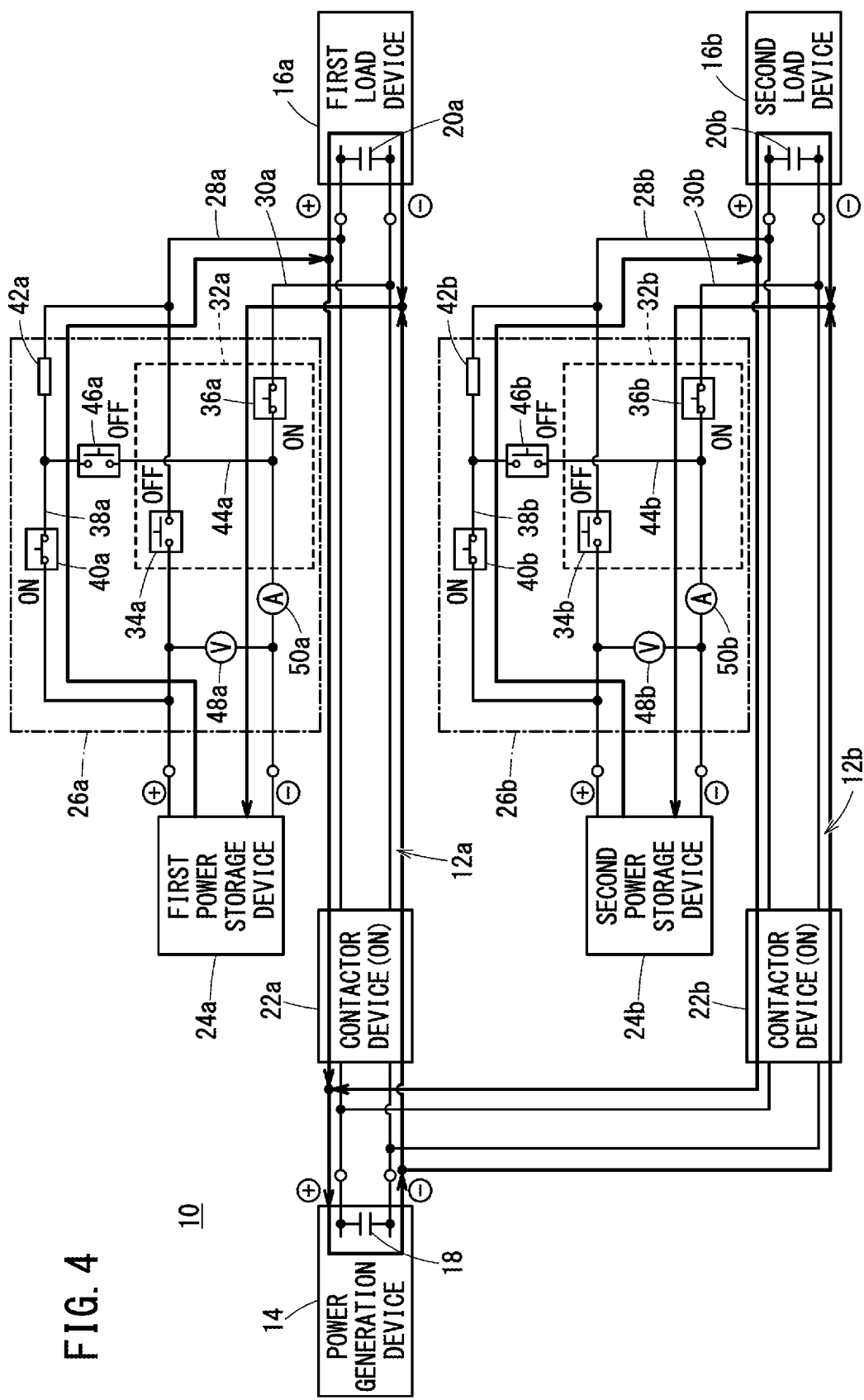
FIG. 4 is a diagram showing the operation of the power supply system in a system start-up preparation process.

FIG. 4 is a diagram showing the operation of the power supply system 10 in the system start-up preparation process. For example, when a user manually turns on a power switch or the like (not shown), the control unit 60 starts the power supply system 10. First, the control unit 60 controls the on/off state of each switch so that precharge of the smoothing capacitors 18 and 20a (a first process) is performed.

The control unit 60 turns on the pair of switches of the contactor device 22a. Further, the control unit 60 controls each switch of the first processing circuit 26a as follows. The control unit 60 turns off the first switch 34a, turns on the second switch 36a, turns on the third switch 40a, and turns off the fourth switch 46a. Then, an RC circuit including the first power storage device 24a, the third switch 40a, the precharge resistor 42a, the contactor device 22a, the smoothing capacitor 18, and the second switch 36a is formed. Further, an RC circuit including the first power storage device 24a, the third switch 40a, the precharge resistor 42a, the smoothing capacitor 20a, and the second switch 36a is formed.

By means of the conductive state described above, the current flows through paths indicated by the arrows in FIG. 4. The smoothing capacitor 18 is supplied with DC power from the first power storage device 24a via the precharge resistor 42a. Electric charges are accumulated in the smoothing capacitor 18, and thus the smoothing capacitor 18 is charged. Similarly, the smoothing capacitor 20a is supplied with DC power from the first power storage device 24a via the precharge resistor 42a. Electric charges are accumulated in the smoothing capacitor 20a, and thus the smoothing capacitor 20a is charged. When the smoothing capacitors 18 and the 20a reach a predetermined voltage, the system start-up preparation is completed.

[Operation of Power Supply System 10 in System Activation Process]

Figure 5:
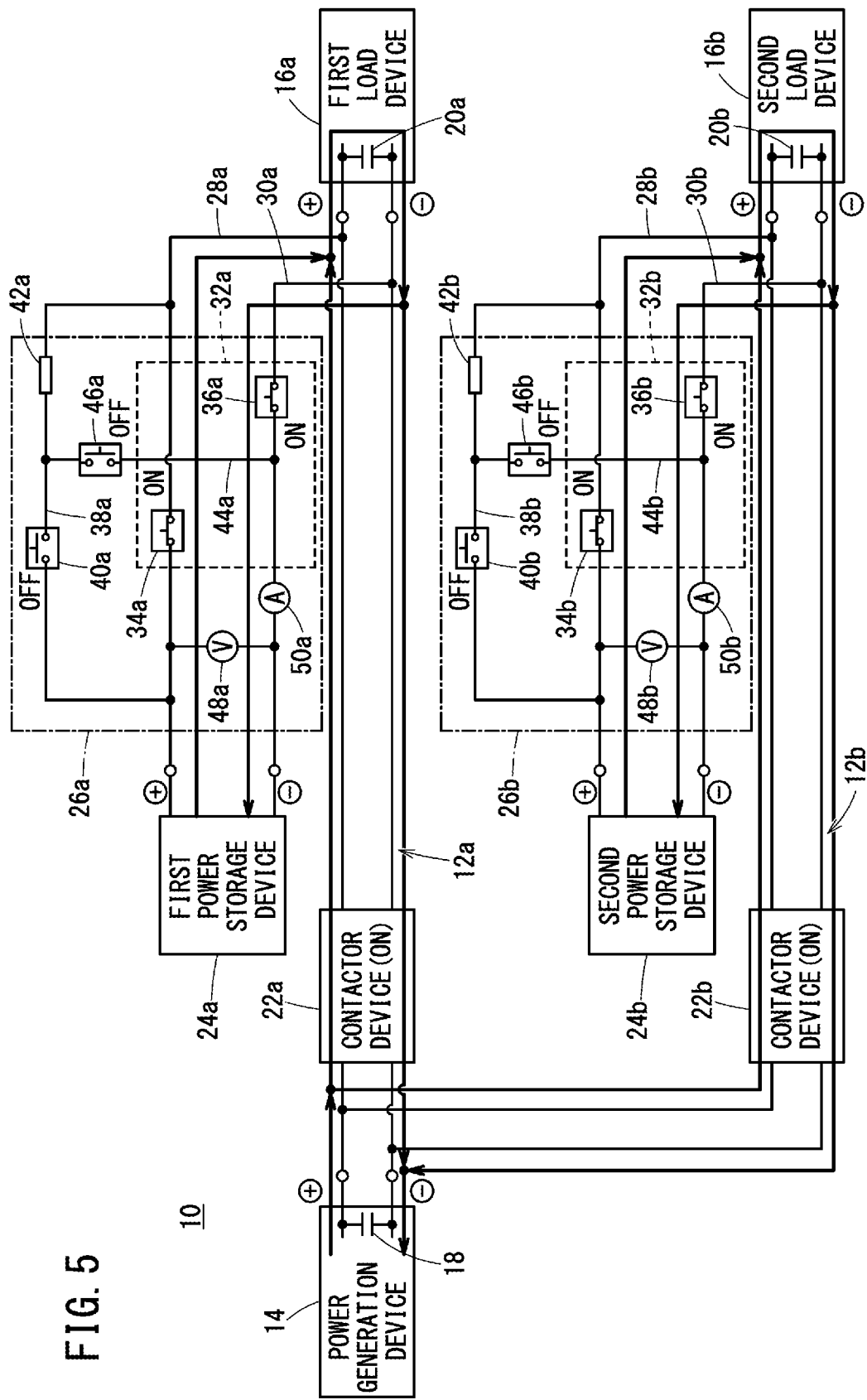
FIG. 5 is a diagram showing the operation of the power supply system in a system activation process.

FIG. 5 is a diagram showing the operation of the power supply system 10 in the system activation process. After the power supply system 10 is started, the control unit 60 controls the on/off state of each switch so as to supply DC power to the first load device 16a.

The control unit 60 turns on the pair of switches of the contactor device 22a. Further, the control unit 60 controls each switch of the first processing circuit 26a as follows. The control unit 60 turns on the first switch 34a, turns on the second switch 36a, turns off the third switch 40a, and turns off the fourth switch 46a.

By means of the conductive state described above, the start-up of the power supply system 10 is completed. Thereafter, the power generation device 14 is started using electric power supplied from at least one of the first power storage device 24a or the second power storage device 24b. At least one of the power generation device 14 or the first power storage device 24a can supply DC power to the first load device 16a. Further, the power generation device 14 can charge the first power storage device 24a. It should be noted that, when an abnormality occurs in the power supply system 10, one or more switches are appropriately turned off by the control unit 60.

[Operation of Power Supply System 10 in System Shutdown Process]

Figure 6:
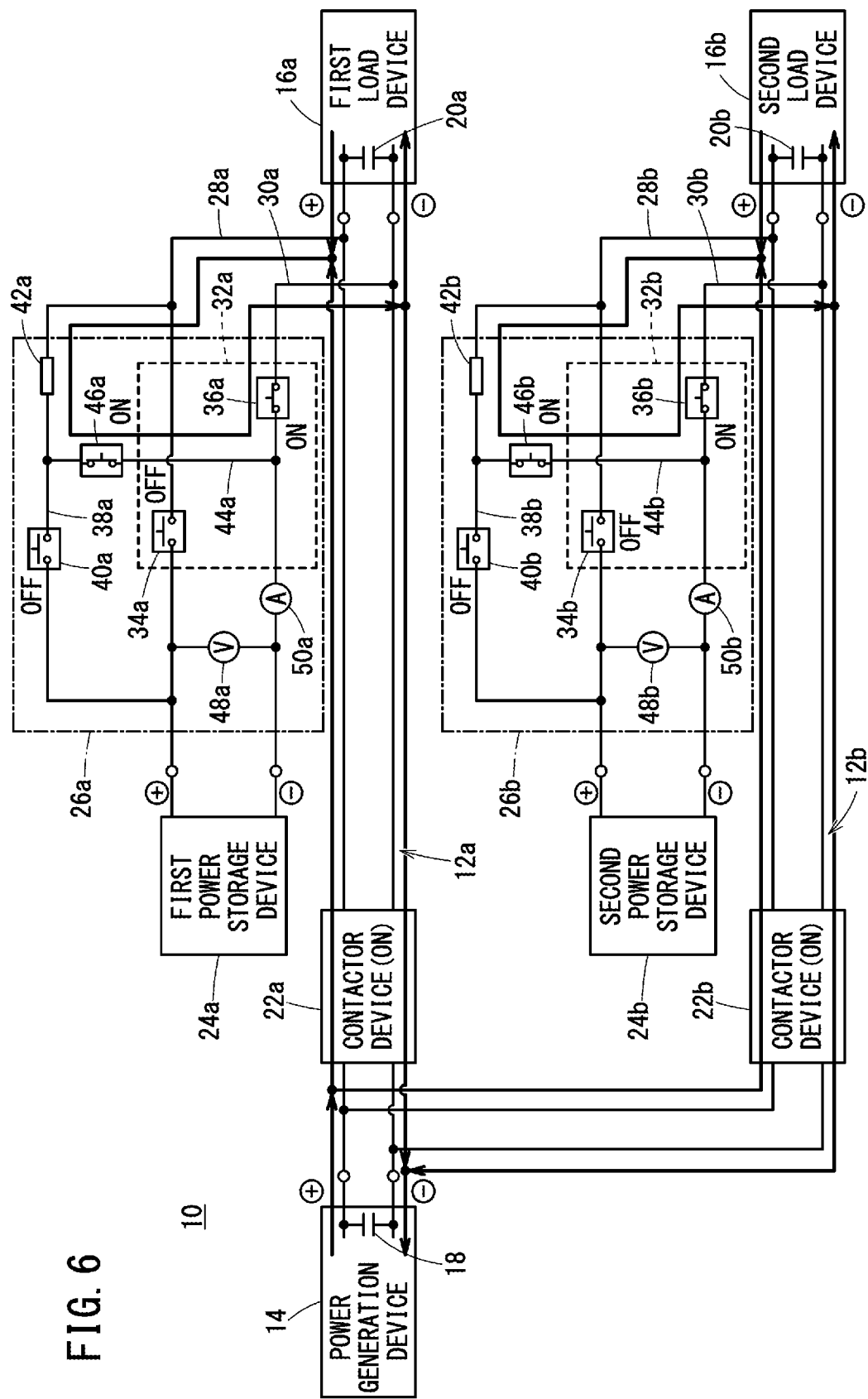
FIG. 6 is a diagram showing the operation of the power supply system in a system shutdown process.

FIG. 6 is a diagram showing the operation of the power supply system 10 in the system shutdown process. When the user manually turns off the power switch or the like, the control unit 60 shuts down the power supply system 10. The control unit 60 controls the on/off state of each switch so that discharge of the smoothing capacitors 18 and 20a (a second process) is performed.

The control unit 60 turns on the pair of switches of the contactor device 22a. Further, the control unit 60 controls each switch of the first processing circuit 26a as follows. The control unit 60 turns off the first switch 34a, turns on the second switch 36a, turns off the third switch 40a, and turns on the fourth switch 46a. Then, an RC circuit including the smoothing capacitor 18, the contactor device 22a, the precharge resistor 42a, the fourth switch 46a, and the second switch 36a is formed. Further, an RC circuit including the smoothing capacitor 20a, the precharge resistor 42a, the fourth switch 46a, and the second switch 36a is formed.

By means of the conductive state described above, the current flows through paths indicated by the arrows in FIG. 6. The electric charges accumulated in the smoothing capacitor 18 are discharged via the precharge resistor 42a. The electric charges accumulated in the smoothing capacitor 20a are discharged via the precharge resistor 42a.

[Operation of Power Supply System 10 in Power Storage Device Discharge Process]

Figure 7:
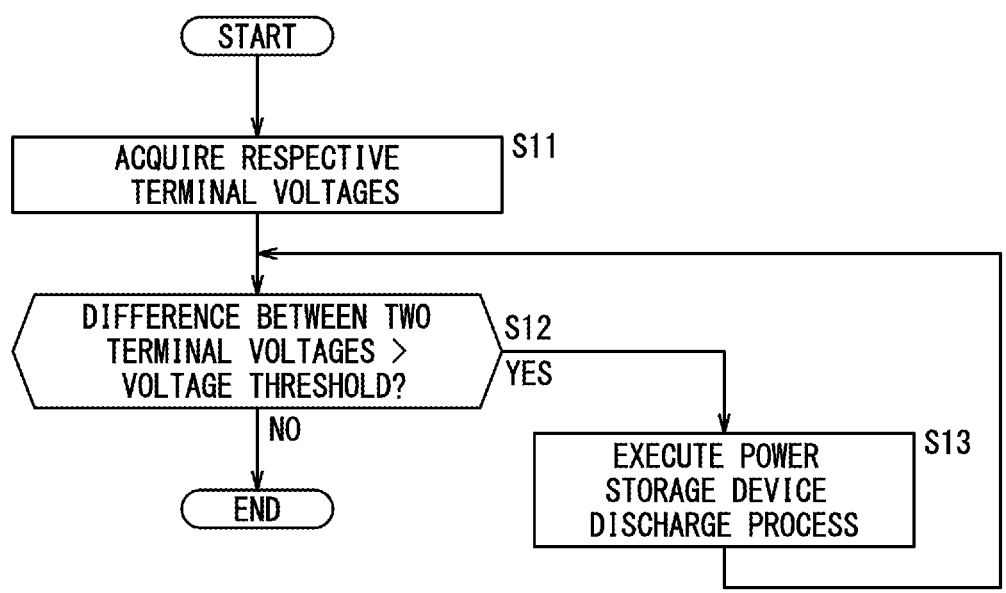
FIG. 7 is a processing flow of a discharge necessity determination process.
Figure 8:
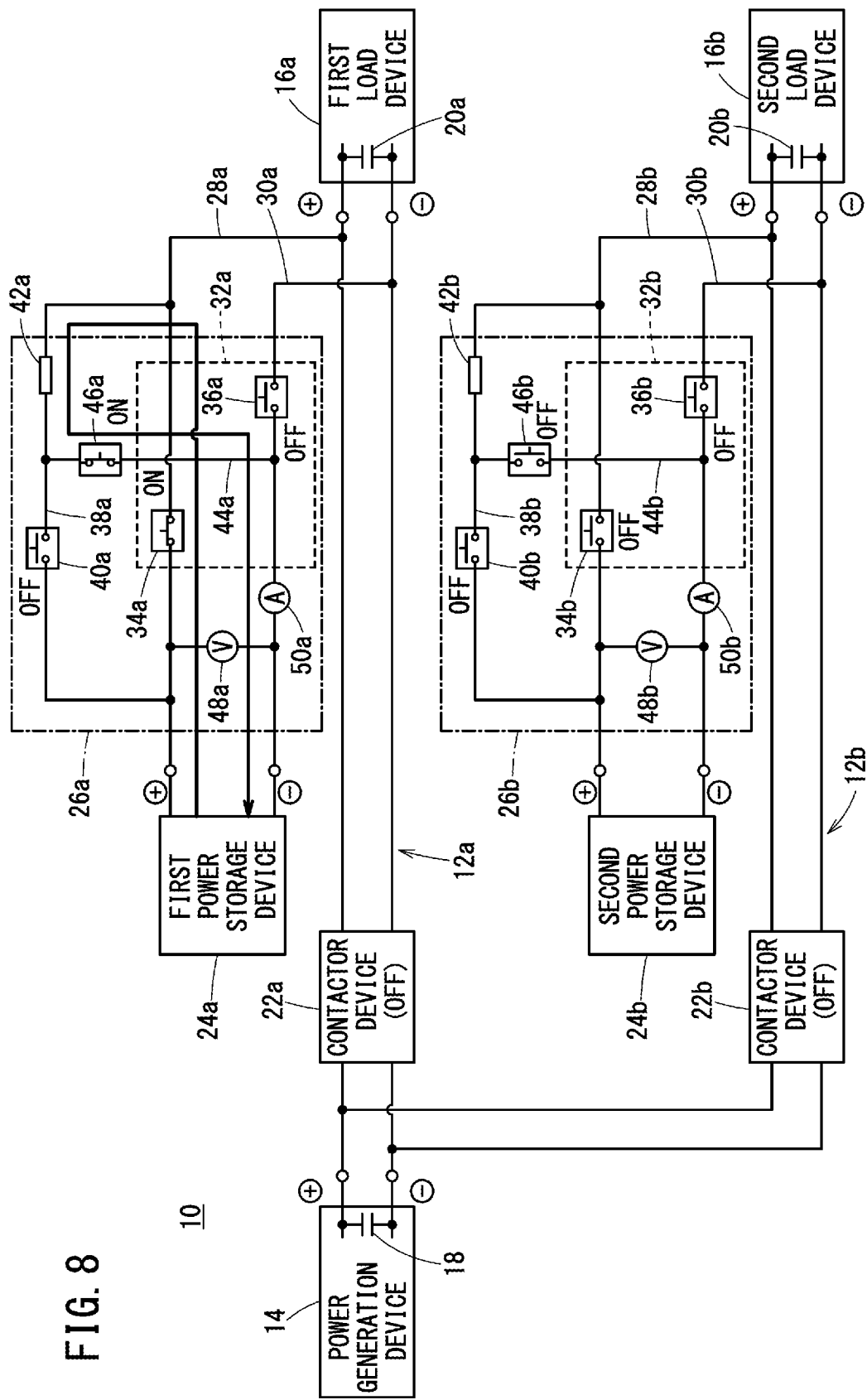
FIG. 8 is a diagram showing the operation of the power supply system in a power storage device discharge process.

FIG. 7 is a processing flow of a discharge necessity determination process. The control unit 60 performs the discharge necessity determination process shown in FIG. 7, between the system shutdown process and the system start-up preparation process. For example, the control unit 60 may periodically perform the discharge necessity determination process, may perform the discharge necessity determination process at a predetermined timing, or may perform the discharge necessity determination process in response to a request from the user. The discharge necessity determination process is a process for determining whether or not the power storage device discharge process shown in FIG. 8 is to be executed, before executing the next system start-up preparation process.

In step S11, the control unit 60 acquires information about the terminal voltage of the first power storage device 24a and the terminal voltage of the second power storage device 24b, based on the detection result of the voltage sensor 48a and the detection result of the voltage sensor 48b.

In step S12, the control unit 60 compares a difference between the terminal voltage of the first power storage device 24a and the terminal voltage of the second power storage device 24b, which are acquired in step S11, with a voltage threshold. The voltage threshold is a value for determining whether or not an overcurrent occurs in the circuit of the power supply system 10. The voltage threshold is preferably a relatively small value. This overcurrent will be described later. The voltage threshold is stored in the storage unit 58 in advance. If the difference between the terminal voltage of the first power storage device 24a and the terminal voltage of the second power storage device 24b is greater than the voltage threshold (step S12: YES), the process proceeds to step S13. On the other hand, if the difference between the terminal voltage of the first power storage device 24a and the terminal voltage of the second power storage device 24b is equal to or less than the voltage threshold (step S12: NO), the discharge necessity determination process shown in FIG. 7 is ended. In this case, the power storage device discharge process does not need to be executed before the execution of the next system start-up preparation process.

When the process proceeds from step S12 to step S13, the control unit 60 executes the power storage device discharge process. In this case, the control unit 60 continues to execute the power storage device discharge process shown in FIG. 8 until the difference between the terminal voltage of the first power storage device 24a and the terminal voltage of the second power storage device 24b becomes equal to or less than the voltage threshold.

FIG. 8 is a diagram showing the operation of the power supply system 10 in the power storage device discharge process. As described above, the control unit 60 performs the power storage device discharge process (a third process) until the difference between the terminal voltage of the first power storage device 24a and the terminal voltage of the second power storage device 24b becomes equal to or less than the voltage threshold. In the following, a case where the terminal voltage of the first power storage device 24a is higher than the terminal voltage of the second power storage device 24b will be described as an example.

The control unit 60 turns off the pair of switches of the contactor device 22a. Further, the control unit 60 controls each switch of the first processing circuit 26a as follows. The control unit 60 turns on the first switch 34a, turns off the second switch 36a, turns off the third switch 40a, and turns on the fourth switch 46a. Then, an RC circuit including the first power storage device 24a, the first switch 34a, the precharge resistor 42a, and the fourth switch 46a is formed. Further, the control unit 60 turns off all of the pair of switches of the contactor device 22b, the first switch 34b, the second switch 36b, the third switch 40b, and the fourth switch 46b.

By means of the conductive state described above, the current flows through paths indicated by the arrows in FIG. 8. Electric charges accumulated in the first power storage device 24a are discharged via the precharge resistor 42a. In this state, the electric charges accumulated in the first power storage device 24a are not supplied to the first load device 16a. The control unit 60 turns off the first switch 34a and the fourth switch 46a when the difference between the terminal voltage of the first power storage device 24a and the terminal voltage of the second power storage device 24b becomes equal to or less than the voltage threshold.

On the other hand, when the terminal voltage of the second power storage device 24b is higher than the terminal voltage of the first power storage device 24a, the control unit 60 turns on the first switch 34b, turns off the second switch 36b, turns off the third switch 40b, and turns on the fourth switch 46b. Further, the control unit 60 turns off all of the pair of switches of the contactor device 22a, the first switch 34a, the second switch 36a, the third switch 40a, and the fourth switch 46a.

[Power Storage Device Deterioration State Estimation Process]

While or after the power storage device discharge process is executed by the control unit 60, the estimation unit 62 estimates the deterioration state of the first power storage device 24a to be discharged. The deterioration state of the first power storage device 24a is also referred to as a state of health (SOH).

The estimation unit 62 calculates an internal resistance value (r) of the first power storage device 24a to be discharged, by using, for example, the following Expression (1).

$$r = (Vocv - Vccv)/i \quad (1)$$

Vocv: Terminal voltage value of power storage device in non-discharge state
Vccv: Terminal voltage value of power storage device during discharge
i: Current value during discharge
r: Internal resistance value of power storage device During the power storage device discharge process, the control unit 60 acquires the terminal voltage value (Vccv) based on the detection result of the voltage sensor 48a. Before or after the execution of the power storage device discharge process, the control unit 60 acquires the terminal voltage value (Vocv) based on the detection result of the voltage sensor 48a. During the power storage device discharge process, the control unit 60 acquires the current value (i) based on the detection result of the current sensor 50a.

The control unit 60 estimates the SOH of the first power storage device 24a from the internal resistance value (r) calculated by the above Expression (1) and the internal resistance value (r) of the first power storage device 24a before deterioration stored in the storage unit 58 in advance. The control unit 60 may store the estimation result in the storage unit 58 or may display the estimation result on a display device (not shown).

The resistance value of the precharge resistor 42a is constant. Therefore, the current (i) within a time period in which the change in the SOC can be ignored during the power storage device discharge process can be regarded as constant. That is, the internal resistance value (r) of the first power storage device 24a calculated by the above Expression (1) can be regarded as constant within the above-described time period in which the change in the SOC can be ignored. Therefore, according to the present embodiment, it is possible to acquire the SOH with high reliability.

[Effects]

In the present embodiment, the first processing circuit 26a is provided with the discharge connection line 44a and the fourth switch 46a. According to the present embodiment, the first power storage device 24a can be discharged without supplying electric power to the first load device 16a. Similarly, in the present embodiment, the second processing circuit 26b is provided with the discharge connection line 44b and the fourth switch 46b. According to the present embodiment, the second power storage device 24b can be discharged without supplying electric power to the second load device 16b.

Figure 12A:
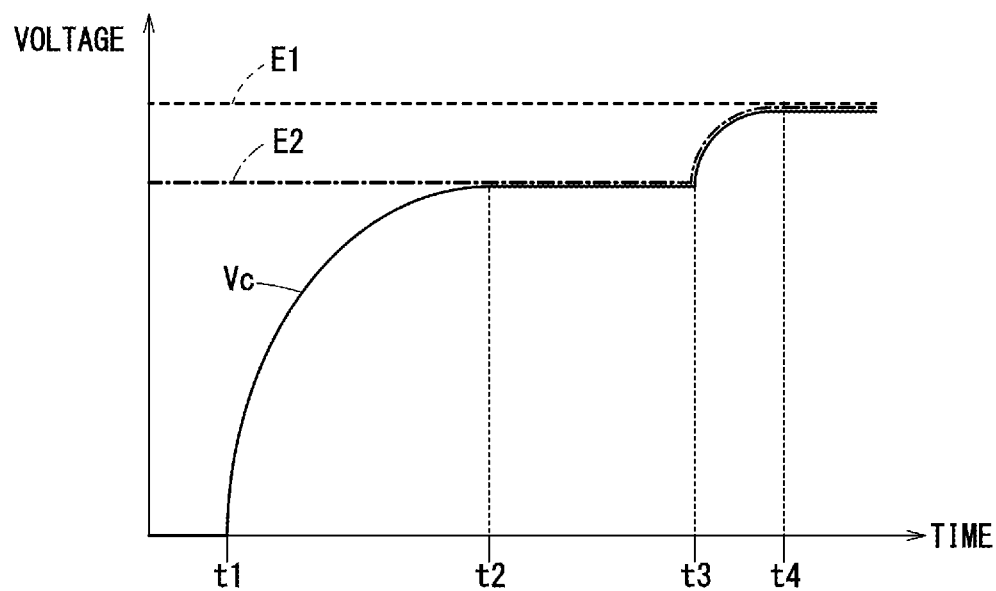
FIG. 12A is a time chart showing a voltage change in the comparative example.
Figure 12B:
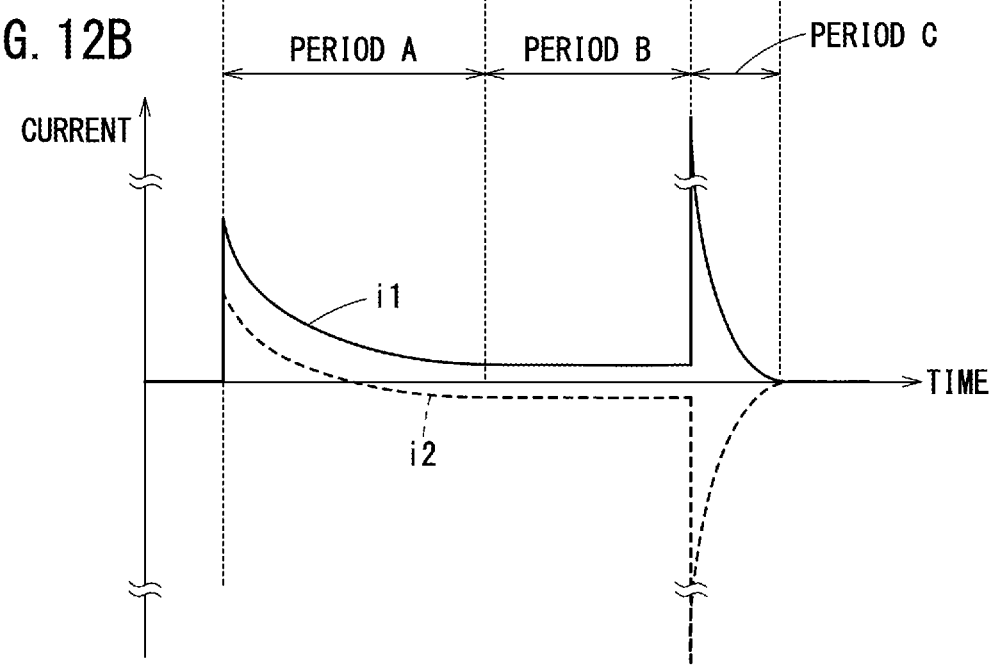
FIG. 12B is a time chart showing a current change in the comparative example.

In order to facilitate understanding of the effects achieved by the present embodiment, a comparative example will be described. Here, a power supply system 100 of a comparative example will be described with reference to FIGS. 9 to 11, FIG. 12A, and FIG. 12B. FIGS. 9 to 11 are diagrams showing the operation of the power supply system 100 of the comparative example. FIG. 12A is a time chart showing voltage over time in the comparative example. FIG. 12B is a time chart showing current over time in the comparative example. The power supply system 100 of the comparative example has the same configuration as the power supply system 10 of the present embodiment except that the power supply system 100 does not include the discharge connection lines 44a and 44b and the fourth switches 46a and 46b.

In the following, the operation state of the power supply system 100 from the start of the system start-up preparation process (pre-charge) to immediately after the start of the system activation process will be described. In the power supply system 100, when the terminal voltage of the first power storage device 24a is represented by E1, and the terminal voltage of the second power storage device 24b is represented by E2, a problem occurs in a case where, at the time of the system start-up preparation process, E2 is less than E1, and E1-E2 is greater than the voltage threshold.

At a time point t1, the system start-up preparation process is started. As shown in FIG. 9, the pair of switches of the contactor device 22a, the second switch 36a, and the third switch 40a are turned on, and the first switch 34a is turned off. Further, the pair of switches of the contactor device 22b, the second switch 36b, and the third switch 40b are turned on, and the first switch 34b is turned off. Then, as shown in FIG. 12B, a current (i1) flows from the first power storage device 24a to the first load device 16a. Similarly, a current (i2) flows from the second power storage device 24b to the second load device 16b. Electric charges are gradually accumulated in the smoothing capacitors 20a and 20b, and as shown in FIG. 12A, a voltage (Vc) of the smoothing capacitors 20a and 20b gradually increases.

At a time point t2, the voltage (Vc) of the smoothing capacitors 20a and 20b reaches the terminal voltage (E2) of the second power storage device 24b. The first power storage device 24a and the second power storage device 24b are electrically connected to each other (are in the conductive state), and the terminal voltage (E1) of the first power storage device 24a is higher than the terminal voltage (E2)

of the second power storage device 24b. Therefore, as shown in FIG. 10, the first power storage device 24a charges the second power storage device 24b.

If the second power storage device 24b is continuously charged by the first power storage device 24a, the terminal voltage (E1) of the first power storage device 24a and the terminal voltage (E2) of the second power storage device 24b become equal to each other. However, it takes a long time to charge the second power storage device 24b by the first power storage device 24a.

It is assumed that the system activation process is started at a time point t3 before E1 and E2 become equal to each other. As shown in FIG. 11, the pair of switches of the contactor device 22a, the first switch 34a, and the second switch 36a are turned on, and the third switch 40a is turned off. Further, the pair of switches of the contactor device 22b, the first switch 34b, and the second switch 36b are turned on, and the third switch 40b is turned off. Then, as shown in FIG. 12B, an overcurrent occurs. As shown in FIG. 12A, the terminal voltage (E2) of the second power storage device 24b rapidly reaches the terminal voltage (E1) of the first power storage device 24a.

As described above, in the electric power supply system 100 of the comparative example, when the system activation process is started in a state where E1 is higher than E2, an overcurrent occurs in the entire circuit of the power supply system 100. In contrast, in the present embodiment, in a case where E1 is higher than E2 at the time of the system shutdown process, the first power storage device 24a can be discharged without supplying electric power to the first load device 16a before the execution of the next system start-up preparation process. Therefore, according to the present embodiment, the system start-up preparation process and the system activation process are never started in the state where E1 is higher than E2. Therefore, according to the present embodiment, it is possible to suppress an overcurrent caused by the situation where E1 is higher than E2.

Further, in the present embodiment, the first power storage device 24a is discharged using the precharge resistor 42a that is usually provided in the circuit for supplying electric power. According to the present embodiment, since a resistor for discharging the first power storage device 24a is not required separately, it is possible to suppress an increase in the number of components.

It should be noted that, in a case where the terminal voltage of the second power storage device 24b is higher than the terminal voltage of the first power storage device 24a and the difference therebetween is greater than the voltage threshold, the control unit 60 operates the contactor devices 22b and 32b, the third switch 40b, and the fourth switch 46b in the same manner as the contactor devices 22a and 32a, the third switch 40a, and the fourth switch 46a in a case where the terminal voltage of the first power storage device 24a is higher than the terminal voltage of the second power storage device 24b. Further, the estimation unit 62 can estimate the deterioration state of the second power storage device 24b based on the detection result of the voltage sensor 48b and the detection result of the current sensor 50b.

Example of Use of Power Supply System 10

Figure 13:
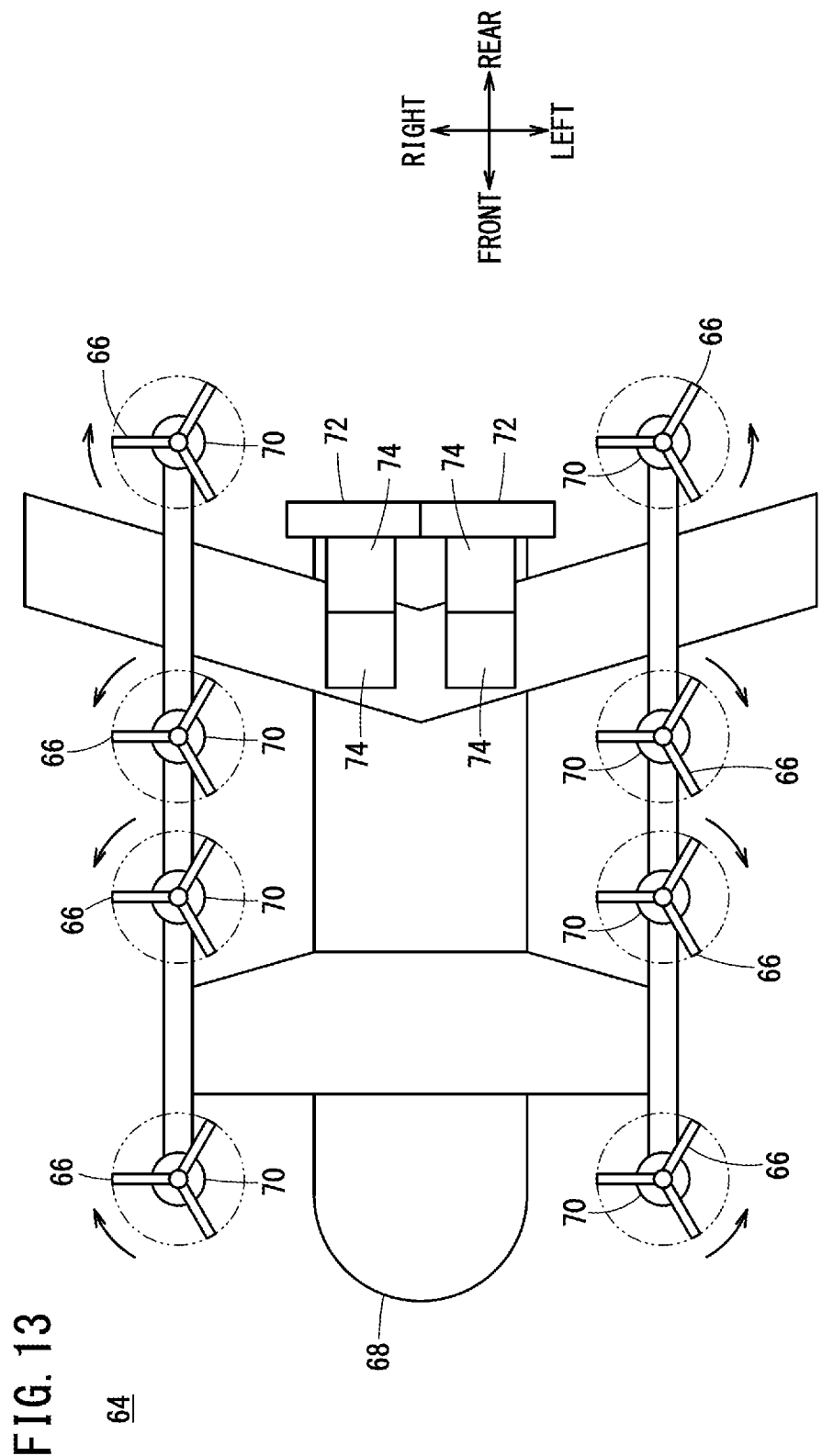
FIG. 13 is a schematic view of a moving object.

FIG. 13 is a schematic view of a moving object 64. The power supply system 10 can be mounted on the moving object 64. The moving object 64 is, for example, an electric vertical take-off and landing aircraft (eVTOL aircraft). The moving object 64 includes eight VTOL rotors 66. The VTOL rotors 66 generate upward thrust for a fuselage 68. The moving object 64 includes eight electric motors 70. One electric motor 70 drives one VTOL rotor 66. The moving object 64 includes two cruise rotors 72. The cruise rotors 72 generate forward thrust for the fuselage 68. The moving object 64 includes four electric motors 74. Two electric motors 74 drive one cruise rotor 72.

Each of the first load device 16a and the second load device 16b may include at least one of the plurality of electric motors 70 and the plurality of electric motors 74. Each of the first load device 16a and the second load device 16b may include a low-voltage drive device in addition to the electric motor 70 and the electric motor 74.

The moving object 64 is not limited to an aircraft, and may be a ship, an automobile, a train, or the like. Further, the power supply system 10 may be used in facilities, factories, and the like, in addition to the moving object 64.

Supplementary Notes

The following notes (appendices) are further disclosed in relation to the above-described embodiment.

Supplementary Note 1

The power supply system (10) includes: the first power supply circuit (12a) configured to supply, to the first load device (16a), DC power output from the power generation device (14); the first power storage device (24a) connected to the first power supply circuit in parallel with the power generation device via the first processing circuit (26a); the second power supply circuit (12b) configured to supply, to the second load device (16b), the DC power output from the power generation device; and the second power storage device (24b) connected to the second power supply circuit in parallel with the power generation device via the second processing circuit (26b), wherein the first processing circuit is configured to selectively perform: the first process of pre-charging the smoothing capacitor (20a) provided in the first load device by supplying electric power from the first power storage device to the first load device via the pre-charge resistor (42a) provided in the first processing circuit; the second process of discharging, via the precharge resistor, the electric charges accumulated in the smoothing capacitor; and the third process of discharging, via the precharge resistor, the electric charges accumulated in the first power storage device.

According to the above configuration, in a case where, at the time of the system shutdown process, the terminal voltage of the first power storage device is higher than the terminal voltage of the second power storage device and the difference therebetween is greater than the voltage threshold, it is possible to discharge the first power storage device without supplying electric power to the first load device before the execution of the next system start-up preparation process. Therefore, according to the above configuration, the system start-up preparation process and the system activation process are never started in a state where the terminal voltage of the first power storage device is higher than the terminal voltage of the second power storage device and the difference therebetween is greater than the voltage threshold. Therefore, according to the above configuration, it is possible to suppress an overcurrent caused by the terminal voltage of the first power storage device being higher than the terminal voltage of the second power storage device and the difference therebetween being greater than the voltage threshold. That is, according to the above configuration, a satisfactory power supply system can be provided.

Furthermore, according to the above configuration, the first power storage device can be discharged using the precharge resistor that is usually provided in the circuit for supplying electric power. According to the above configuration, since a resistor for discharging the first power storage device is not required separately, it is possible to suppress an increase in the number of components.

Supplementary Note 2

In the power supply system according to Supplementary Note 1, the first processing circuit may include the pair of wires (28a, 30a) configured to electrically connect the first power storage device and the first load device to each other, the first switch (34a) provided on the first wire (28a) that is one of the pair of wires, and the second switch (36a) provided on the second wire (30a) that is another of the pair of wires, one end of the precharge resistor may be electrically connected to a portion of the first wire located between the first switch and the first load device, and another end of the precharge resistor may be connected via the third switch (40a) to a portion of the first wire located between the first switch and the first power storage device, and connected via the fourth switch (46a) to a portion of the second wire located between the second switch and the first power storage device.

Supplementary Note 3

In the power supply system according to Supplementary Note 2, in the first process, the smoothing capacitor provided in the first load device may be pre-charged by turning off the first switch, turning on the second switch, turning on the third switch, and turning off the fourth switch.

Supplementary Note 4

In the power supply system according to Supplementary Note 2 or 3, in the second process, the electric charges accumulated in the smoothing capacitor may be discharged via the precharge resistor by turning off the first switch, turning on the second switch, turning off the third switch, and turning on the fourth switch.

Supplementary Note 5

In the power supply system according to any one of Supplementary Notes 2 to 4, in the third process, the electric charges accumulated in the first power storage device may be discharged via the precharge resistor by turning on the first switch, turning off the second switch, turning off the third switch, and turning on the fourth switch.

Supplementary Note 6

In the power supply system according to any one of Supplementary Notes 2 to 5, the first processing circuit may execute the first process after performing the third process until the difference between the terminal voltage of the first power storage device and the terminal voltage of the second power storage device becomes equal to or less than the voltage threshold determined in advance.

Supplementary Note 7

The power supply system according to any one of Supplementary Notes 2 to 6 may further include the estimation unit (62) configured to calculate the internal resistance value (r) of the first power storage device based on the terminal voltage (Vocv) of the first power storage device in a non-discharge state, the terminal voltage (Vccv) of the first power storage device that is being discharged, the resistance value (R) of the precharge resistor, and the current value (i) of the first power storage device that is being discharged, and estimate the deterioration state (SOH) of the first power storage device based on the internal resistance value.

The resistance value of the precharge resistor is constant. Therefore, the current (i) within a time period in which the change in the SOC can be ignored during the power storage device discharge process can be regarded as constant. That is, the internal resistance value (r) of the first power storage device calculated as described above can be regarded as constant within the above-described time period in which the change in the SOC can be ignored. Therefore, according to the above configuration, it is possible to acquire the SOH with high reliability.

Supplementary Note 8

In the power supply system according to any one of Supplementary Notes 1 to 7, in the first process, the smoothing capacitor (18) provided in the power generation device may be pre-charged by supplying electric power from the first power storage device to the power generation device via the precharge resistor provided in the first processing circuit.

Supplementary Note 9

The moving object (64) includes the power supply system according to any one of Supplementary Notes 1 to 8.

The present invention is not limited to the above disclosure, and various modifications are possible without departing from the essence and gist of the present invention.

The invention claimed is:

1. A power supply system comprising:
a first power supply circuit configured to supply, to a first load device, direct current electric power output from a power generation device;
a first power storage device connected to the first power supply circuit in parallel with the power generation device via a first processing circuit;
a second power supply circuit configured to supply, to a second load device, the direct current electric power output from the power generation device; and
a second power storage device connected to the second power supply circuit in parallel with the power generation device via a second processing circuit,
wherein
the first processing circuit is configured to selectively perform:
  a first process of pre-charging a smoothing capacitor provided in the first load device by supplying electric power from the first power storage device to the first load device via a precharge resistor provided in the first processing circuit;
  a second process of discharging, via the precharge resistor, electric charges accumulated in the smoothing capacitor; and
  a third process of discharging, via the precharge resistor, electric charges accumulated in the first power storage device,
the first processing circuit includes:
  a pair of wires configured to electrically connect the first power storage device and the first load device to each other;
  a first switch provided on a first wire that is one of the pair of wires; and
  a second switch provided on a second wire that is another of the pair of wires,
one end of the precharge resistor is electrically connected to a portion of the first wire located between the first switch and the first load device, and
another end of the precharge resistor is connected via a third switch to a portion of the first wire located between the first switch and the first power storage device, and is connected via a fourth switch to a portion of the second wire located between the second switch and the first power storage device.

2. The power supply system according to claim 1, wherein
in the first process, the smoothing capacitor provided in the first load device is pre-charged by turning off the first switch, turning on the second switch, turning on the third switch, and turning off the fourth switch.

3. The power supply system according to claim 1, wherein
in the second process, the electric charges accumulated in the smoothing capacitor are discharged via the precharge resistor by turning off the first switch, turning on the second switch, turning off the third switch, and turning on the fourth switch.

4. The power supply system according to claim 1, wherein
in the third process, the electric charges accumulated in the first power storage device are discharged via the precharge resistor by turning on the first switch, turning off the second switch, turning off the third switch, and turning on the fourth switch.

5. The power supply system according to claim 1, wherein
the first processing circuit executes the first process after performing the third process until a difference between a terminal voltage of the first power storage device and a terminal voltage of the second power storage device becomes equal to or less than a voltage threshold determined in advance.

6. The power supply system according to claim 1, further comprising one or more processors that execute computer-executable instructions stored in a memory, wherein
the one or more processors execute the computer-executable instructions to cause the power supply system to: calculate an internal resistance value of the first power storage device based on a terminal voltage of the first power storage device in a non-discharge state, the terminal voltage of the first power storage device that is being discharged, a resistance value of the precharge resistor, and a current value of the first power storage device that is being discharged; and estimate a deterioration state of the first power storage device based on the internal resistance value.

7. A power supply system comprising:
a first power supply circuit configured to supply, to a first load device, direct current electric power output from a power generation device;
a first power storage device connected to the first power supply circuit in parallel with the power generation device via a first processing circuit;
a second power supply circuit configured to supply, to a second load device, the direct current electric power output from the power generation device; and
a second power storage device connected to the second power supply circuit in parallel with the power generation device via a second processing circuit,
wherein
the first processing circuit is configured to selectively perform:
a first process of pre-charging a smoothing capacitor provided in the first load device by supplying electric power from the first power storage device to the first load device via a precharge resistor provided in the first processing circuit;
a second process of discharging, via the precharge resistor, electric charges accumulated in the smoothing capacitor; and
a third process of discharging, via the precharge resistor, electric charges accumulated in the first power storage device, and
in the first process, a smoothing capacitor provided in the power generation device is pre-charged by supplying electric power from the first power storage device to the power generation device via the precharge resistor provided in the first processing circuit.

8. A moving object comprising the power supply system according to claim 1.

9. A moving object comprising the power supply system according to claim 7.

* * * * *